United States Patent
Liao et al.

(10) Patent No.: US 11,146,985 B2
(45) Date of Patent: Oct. 12, 2021

(54) QUALITY OF SERVICE PROVISIONING FRAMEWORK FOR A SDN-BASED CELLULAR NETWORK ARCHITECTURE

(71) Applicant: Apple Inc., Cupertino, CA (US)

(72) Inventors: Ching-Yu Liao, Hillsboro, OR (US); Mohammad Mamunur Rashid, Hillsboro, OR (US); S. M. Iftekharul Alam, Hillsboro, OR (US); Rath Vannithamby, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/768,945

(22) PCT Filed: Mar. 31, 2016

(86) PCT No.: PCT/US2016/025399
§ 371 (c)(1),
(2) Date: Aug. 6, 2018

(87) PCT Pub. No.: WO2017/074495
PCT Pub. Date: May 4, 2017

(65) Prior Publication Data
US 2018/0317121 A1 Nov. 1, 2018

Related U.S. Application Data

(60) Provisional application No. 62/247,681, filed on Oct. 28, 2015.

(51) Int. Cl.
*H04W 28/02* (2009.01)
*H04W 28/10* (2009.01)
(Continued)

(52) U.S. Cl.
CPC ......... *H04W 28/0268* (2013.01); *H04L 45/02* (2013.01); *H04L 45/22* (2013.01);
(Continued)

(58) Field of Classification Search
CPC ......... H04W 28/0268; H04W 28/0289; H04W 28/10
See application file for complete search history.

(56) References Cited

U.S. PATENT DOCUMENTS

| | | | |
|---|---|---|---|
| 7,558,283 B2 * | 7/2009 | Zheng | H04W 28/24 370/437 |
| 8,159,966 B1 * | 4/2012 | Mabee | H04L 41/5022 370/252 |

(Continued)

FOREIGN PATENT DOCUMENTS

EP 2448194 A1 * 5/2012 ......... H04L 47/2441

OTHER PUBLICATIONS

Taiwanese Office Action dated Nov. 20, 2019 for Taiwanese Application No. 105130474.

*Primary Examiner* — Rasheed Gidado
(74) *Attorney, Agent, or Firm* — Eschweiler & Potashnik, LLC

(57) ABSTRACT

An SDN architecture, for a cellular communications system, is described herein that includes a Quality of Service (QoS) provisioning framework to provision and manage traffic flows in the cellular communications system. The described architecture separates the control plane and the user plane for the transport of the user plane traffic. Network entities in the SDN architecture, such as a network controller, can detect and react to changes in network state (e.g., load conditions) to route or reroute traffic flows in the network. QoS and routing parameters may be determined for the network traffic on a per-flow basis, even when multiple flows are associated with a single service request.

21 Claims, 9 Drawing Sheets

(51) Int. Cl.
*H04L 12/707* (2013.01)
*H04L 12/725* (2013.01)
*H04L 12/751* (2013.01)
*H04L 12/803* (2013.01)
*H04L 12/721* (2013.01)

(52) U.S. Cl.
CPC ............ *H04L 45/302* (2013.01); *H04L 45/38* (2013.01); *H04L 47/122* (2013.01); *H04W 28/0289* (2013.01); *H04W 28/10* (2013.01)

(56) References Cited

U.S. PATENT DOCUMENTS

| | | | |
|---|---|---|---|
| 8,170,572 B2 * | 5/2012 | Park | H04L 41/0816 455/452.2 |
| 10,530,699 B2 * | 1/2020 | Ni | H04L 45/42 |
| 2006/0252429 A1 * | 11/2006 | Chen | H04W 28/24 455/450 |
| 2008/0274729 A1 * | 11/2008 | Kim | H04W 28/24 455/423 |
| 2009/0103454 A1 * | 4/2009 | Watanabe | H04L 47/14 370/254 |
| 2009/0300207 A1 * | 12/2009 | Giaretta | H04L 47/2483 709/232 |
| 2011/0310740 A1 * | 12/2011 | Ju | H04W 28/08 370/235 |
| 2011/0317558 A1 * | 12/2011 | Siddam | H04W 28/16 370/235 |
| 2012/0003923 A1 * | 1/2012 | Pazos | G06Q 30/06 455/3.06 |
| 2014/0078899 A1 * | 3/2014 | Zhou | H04L 41/0893 370/230 |
| 2015/0138952 A1 * | 5/2015 | Tamura | H04L 45/58 370/225 |
| 2015/0263957 A1 * | 9/2015 | Wang | H04W 4/90 370/230 |
| 2016/0095042 A1 * | 3/2016 | Wadhwa | H04W 40/02 370/328 |
| 2016/0301607 A1 * | 10/2016 | Man | H04L 45/38 |

* cited by examiner

QUALITY OF SERVICE PROVISIONING FRAMEWORK FOR A SDN-BASED CELLULAR NETWORK ARCHITECTURE

RELATED APPLICATIONS

The present application claims the benefit of U.S. Provisional Patent Application No. 62/247,681, which was filed on Oct. 28, 2015; and of PCT Application PCT/US16/25399, which was filed on Dec. 26, 2015, the contents of which are hereby incorporated by reference as though fully set forth herein.

BACKGROUND

LTE (Long-Term Evolution) is a standard for wireless communication of high-speed data for mobile phones and data terminals (mobile devices). An LTE cellular communication system may include a Radio Access Network (RAN) section and a "core" network section. The RAN section generally handles the wireless (radio) communications with the mobile devices. The "core" portion may generally handle control, handover, and routing functionality relating to providing data services to the mobile devices. The core portion may include gateway devices that connect users of the cellular communication system to external networks (e.g., the Internet).

For user plane traffic transmission, existing mobile core networks, such as the Third Generation Partnership Project (3GPP) Evolved Packet Core (EPC), may maintain both control plane and data plane tunnels between corresponding gateways (e.g., Serving Gateways (SGWs) or Packet Data Network Gateways (PGWs)). When a gateway is added or removed from the network, the system operator may need to reconfigure the network architecture to integrate the added/removed gateway.

Additionally, in the existing EPC architecture, for services established by a mobile device, a Packet Data Network (PDN) connection may be formed. The PDN connection may be carried using a General Packet Radio Service (GPRS) Tunnel Protocol (GTP) tunnel over the S5/S8 interface. Within the same GTP tunnel, over the S5/S8 interface, all of the traffic flows may be transmitted via the same routes between the SGW and the PGW. Due to a lack of separation between control and data plane, it can be difficult to dynamically enforce QoS since modifying tunnels is non-trivial. Using a fixed routing path, in this manner, is therefore not optimal from a QoS perspective.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

An SDN architecture, for a cellular communications system, is described herein that includes a Quality of Service (QoS) provisioning framework to provision and manage traffic flows in the cellular communications system. The described architecture separates the control plane and the user plane for the transport of the user plane traffic. Network entities in the SDN architecture, such as a network controller, can detect and react to changes in network state (e.g., load conditions, failure route information) to route or reroute traffic flows in the network. QoS and routing parameters may be determined for the network traffic on a per-flow basis, even when multiple flows are associated with a single service request.

Figure 1:
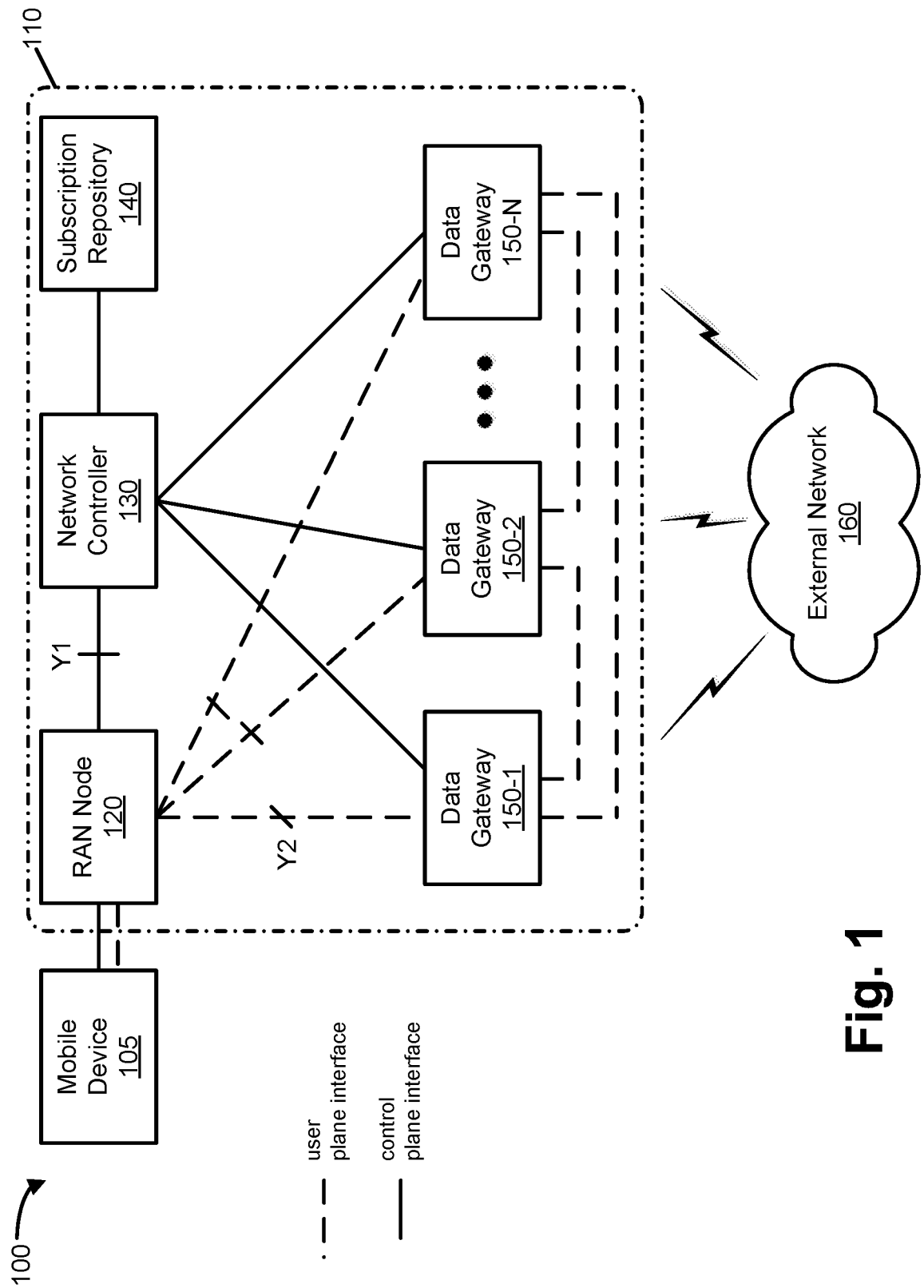
FIG. 1 is a diagram of an example environment in which systems and/or methods described herein may be implemented.

FIG. 1 is a diagram of an example environment 100 in which systems and/or methods described herein may be implemented. Environment 100 may generally provide a Software Defined Network (SDN)-based architecture that separates control plane signaling messages and user plane data traffic. In FIG. 1, the control plane interface is illustrated with solid lines and the user plane interface is illustrated with dashed lines.

As illustrated, environment 100 may include mobile device 105, wireless network 110, and external network 160. Wireless network 110 may represent a wireless cellular communications network, such as a network based on the Third Generation Partnership Project (3GPP) standards. Wireless network 110 may include a radio access network portion and a core portion. The radio access portion may generally provide the wireless (e.g., radio) interface with mobile device 105. The core portion may provide back-end control plane and user plane transport paths, user control and authentication, handover coordination, and other features. The radio access portion may include at least one RAN node 120. The core portion may include at least one network controller 130, a subscription repository 140, and data gateways 150-1 through 150-N. For simplicity, a single RAN node 120 and a single network controller 130 are shown. The core portion may be based on an Internet Protocol (IP)-based network architecture. Links in the core portion may be implemented via wireless or wired connections.

Mobile device 105 may include a portable computing and communication device, such as a personal digital assistant (PDA), a smart phone, a cellular phone, a laptop computer with connectivity to a cellular wireless network, a tablet computer, etc. In the context of some 3GPP networks, mobile device 105 may be referred to as User Equipment (UE). Mobile device 105 may also include non-portable computing devices, such as desktop computers, consumer or business appliances, or other devices that have the ability to wirelessly connect to network 110. For simplicity, a single mobile device 105 is shown. In practice, multiple mobile devices 105 may operate in the context of a wireless network. To obtain service authorization, mobile devices 105 may transmit, via RAN node 120, service request messages to network controller 130. If authorized for the service, by network controller 130, mobile device 105 may send user plane data traffic to RAN node 120.

In some implementations, for service requests that are approved by wireless network 110, a flow identifier may be received by mobile device 105 for each traffic flow associated with the service request. The flow identifier may potentially be included, by mobile device 105, in a header field of each packet transmitted to RAN node 120. Alternatively or additionally, in some implementations, RAN node 120, instead of mobile device 105, may identify the packets, received from mobile device 105, as corresponding to particular flows or flow identifiers (e.g., based on the source and destination addresses, port numbers, and traffic type information included in each packet header). A "traffic flow," as used herein, may refer to a logical grouping of packet data that is associated with a source address, destination address, and packet QoS parameters.

RAN node 120 may implement a base station capable of implementing a wireless interface with mobile device 105. RAN node 120 may include, for example, antennas and associated antenna transceiver circuitry. Thus, RAN node 120 may provide radio resources for mobile device 105. In some implementations, RAN node 120 may be referred to as an Evolved Node B (eNB). RAN node 120 may include a macrocell node, which may be a node capable of providing wireless network connectivity in a relatively large area. Alternatively or additionally, RAN node 120 may include a small cell that may be deployed to increase system capacity by including a coverage area within a macro cell. Small cells may include, for example, picocells, femtocells, and/or home NodeBs. For simplicity, a single RAN node 120 is shown in FIG. 1. In practice, multiple RAN nodes 120 may operate in the context of a wireless network.

Consistent with aspects described herein, RAN node 120 may additionally operate to receive flow profiles and routing policies, for services requested by mobile device 105, from network controller 130. The flow profile of a traffic flow may, for example, include Quality of Service (QoS) parameters that are to be applied to the traffic flow. The QoS parameters may indicate, for example, the required packet data rate, the required latency, flow priority, packet jitter requirements, etc. The routing policies may indicate how the traffic flow is to be routed in wireless network 110, such as by identifying a data gateway 150 to which RAN node 120 is to forward the packets of a particular traffic flow. RAN node 120 may receive user plane traffic from mobile device 105 and enforce the traffic parameters (associated with the flow profile) and the routing policies provided by network controller 130. According to the routing policies and flow profiles of the service, when receiving user plane traffic from mobile device 105, RAN node 120 may forward the associated traffic flows via different Y2 interfaces with different data gateways, e.g. data gateway 150-1 and data gateway 150-2.

Network controller 130 may include one or more computation and communication devices that act as a control node for RAN node 120 and/or other devices that provide the air interface for the wireless telecommunications network. For example, network controller 130 may perform operations to register mobile device 105 with the wireless telecommunications network 110, establish traffic flows associated with a session with mobile device 105, to hand off mobile device 105 to different RAN nodes 120, and/or to perform other operations.

Consistent with aspects described herein, network controller 130 may determine routing policies for traffic flows requested by mobile device 105 and configure/reconfigure the routing policies at one or more data gateways 150. In one implementation, in response to a service request from mobile device 105, network controller 130 may determine one or more traffic flows corresponding to the service request. Network controller 130 may determine, such as by querying subscription repository 140, a flow profile for each of the traffic flows. A flow profile may include information that describes a particular traffic flow and may include a flow identifier value assigned by network controller 130 and traffic parameters that should be applied to the traffic flow. The traffic parameters may include, for example, an indication of traffic type, the required packet data rate, required latency of the traffic flow, flow priority data, packet jitter requirements, or other parameters.

Network controller 130 may also, based on the traffic flow parameters, determine routing policies relating to each traffic flow. The routing policies may indicate preferred routing paths through wireless network 110 and/or particular target ("boundary") data gateways 150 for each of the traffic flows. The boundary data gateway is the target data gateway which has the interface connecting to the external network 160. Different traffic flows from the same mobile device or the same service request may be assigned to different data gateways 150. Network controller 130 may also provide the routing policies and the flow profiles to data gateways 150 and to RAN node 120.

Subscription repository 140 may include one or more computation and communication devices to store subscription and/or policy information relating to users of wireless network 110 as well as related information of subscribed services for each of the users. For example, subscription repository 140 may include account information associated with each user and/or each mobile device 105, information relating to QoS or other traffic policies of the subscribed services associated with each user and/or each mobile device 105, authentication information for each user and/or each mobile device 105, or other information. In one implementation, subscription repository may particularly store the QoS-related traffic parameters for which a particular user/mobile device has contracted. Thus, in response to a query from network controller 130 for the traffic parameters associated with a particular type of traffic and user, network controller 130 may respond with the contracted QoS parameters of the traffic (e.g., packet error rate, packet latency, and priority values). In some implementations, subscription repository 140 may be implemented internally by network controller 130 (e.g., as a data structure(s) stored by network controller 130).

Data gateways 150 may each include one or more devices that act as the point of interconnect between wireless network 110 and external networks or services, such as external network 160. Data gateways 150 may forward packets to and from wireless network 110, and external network 160.

External network 160 may include one or more packet-based networks, a public network (e.g., the Internet), and/or or proprietary networks that provide services that are provided by the operator of wireless network 110 (e.g., IP multimedia (IMS)-based services, transparent end-to-end packet-switched streaming services (PSSs), or other services).

A number of interfaces are illustrated in FIG. 1. An interface may refer to a physical or logical connection between devices in environment 100. The illustrated interfaces may be 3GPP standardized interfaces. For example, as illustrated, RAN node 120 may connect to network controller 130 using the Y1 interface and RAN node 120 may connect to data gateways 150 using the Y2 interface. The Y1 interface may be a control plane interface and the Y2 interface may be a user plane interface between RAN node 120 and one or more data gateways 150. For a service requested by a mobile device 105, according to the routing policies and flow profiles of the service, the RAN node 120 may forward the associated traffic flows via different Y2 interfaces with different corresponding data gateways, e.g. data gateway 150-1 and data gateway 150-2.

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of environment 100 may perform one or more functions described as being performed by another one or more of the devices of environment 100. Furthermore, while "direct" connections are shown in FIG. 1, these connections should be interpreted as logical communication pathways, and in practice, one or more intervening devices (e.g., routers, gateways, modems, switches, hubs, etc.) may be present.

Figure 2:
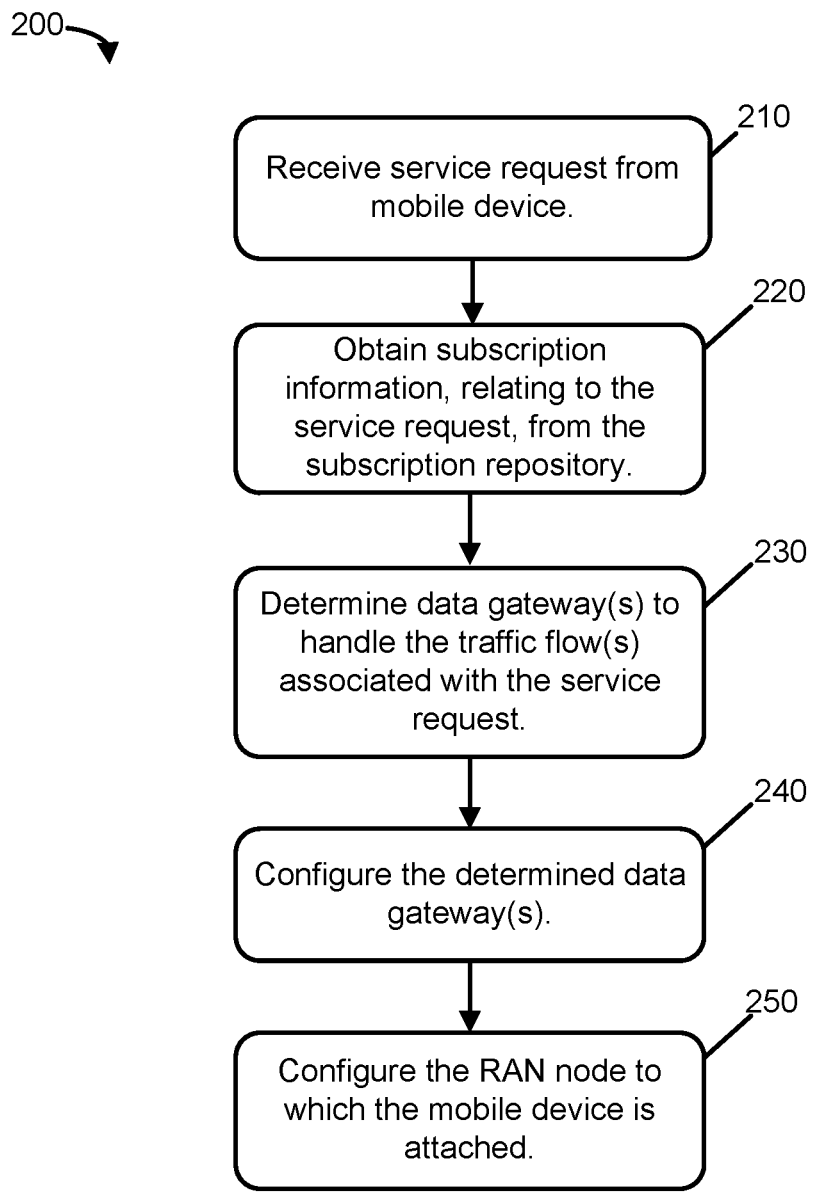
FIG. 2 is a flowchart illustrating a process for handling service requests sent by mobile devices.

FIG. 2 is a flowchart illustrating a process 200 for handling service requests by mobile devices 105. Process 200 may be performed by, for example, network controller 130.

Process 200 may include receiving a service request from a mobile device (block 210). The service request may have been forwarded from RAN node 120 to network controller 130, and be received as a control plane message. The service request may correspond to, for example, data services required by a particular mobile device 105 or an application being executed by mobile device 105. In some situations, a single service may correspond to multiple traffic flows. Network controller 130 may determine the traffic flows corresponding to the service request. A traffic flow may refer to IP traffic that is defined by a flow profile that may include source and destination IP addresses, one or more port numbers, an indication of the protocol type, and the QoS traffic parameters for the traffic flow. When a service includes multiple traffic flow types (e.g., selected from video, voice, text, etc.), each traffic flow may have different traffic requirements (e.g., different packet error rates, latency requirements, or priorities) and thus a different flow profile.

Process 200 may further include obtaining subscription information, relating to the service request, from the subscription repository (block 220). For example, based on an identifier included in or as part of the service request (e.g., an identifier of the mobile device), network controller 130 may query subscription repository 140 for subscription-related information associated with mobile device 105 or the requested service. The subscription-related information may include the QoS parameters of the requested service that are to be provisioned for the mobile device and/or service, and may particularly include, for example, identification of bandwidth allotments of mobile device 105, packet error rates, packet latency requirements, and/or flow priority. In some implementations, the subscription-related information may additionally include information relating to the authorization and/or authentication of mobile device 105 to access wireless network 110, or other information specific to particular service users, or organizations.

Process 200 may further include determining the data gateway(s) to handle the traffic flow(s) associated with the service request (block 230). In some implementations, network controller 130 may select different data gateways 150 to handle different traffic flows. The selection of the gateways may be based on network load at various data gateways 150, network load at other portions of wireless network 110, network load at portions of external network 160, latency at data gateways 150 or elsewhere, the traffic parameters of the traffic flows, or other factors. The selection of the gateways may include selecting a source gateway as a data gateway 150 to which RAN node 120 is to initially forward traffic and a target gateway as a data gateway 150 that acts as the boundary gateway between wireless network 110 and external network 160. Based on the determined gateways, network controller 130 may also determine a routing policy for each traffic flow. A routing policy may include an indication of the source data gateway, the target data gateway, and the flow identifier of the packet flow. The indication can also be in the form of an identification or an IP address.

Process 200 may further include configuring the determined data gateways (block 240). Network controller 130 may, for instance, set the flow profiles and routing policies, at one or more of data gateways 150, for each of the traffic flows that correspond to the service request. As previously mentioned, the flow profile, for each traffic flow, may include a flow identifier (ID) associated with the traffic flow, an indication of the traffic type of the traffic flow, and QoS traffic parameters for the traffic flow. The flow identifier may be unique for all traffic flows associated with a particular mobile device 105. In some implementations, instead of, or in addition to, using an explicit flow identifier, the flow identifier may constructed as the traffic source and destination IP addresses for the traffic flow, port numbers associated with the traffic flow, and/or a traffic type identifier associated with the traffic flow. As an example of a flow profile, the flow profile for a particular traffic flow may be associated with the flow ID "A", be indicated as including voice type traffic, have a Packet Error Rate threshold of $10^{-3}$, have a latency (delay) threshold of 10 milliseconds (ms), and be assigned a priority value of 1. As another example, another traffic flow may be associated with the flow ID "B", be indicated as including video type traffic, have a Packet Error Rate threshold of $10^{-3}$, have a latency threshold of 50 ms, and be assigned a priority value of 2.

Process 200 may further include configuring the RAN node to which the mobile device is attached (block 250). Network controller 130 may, for instance, set the flow profiles and the routing policy at RAN node 120. The source data gateway 150 for each traffic flow may, for instance, be configured at RAN node 120. User plane traffic having multiple traffic flows may have the same or different source data gateways 150. User plane traffic that is received at RAN node 120, from mobile device 105, may be routed, by RAN node 120, to the appropriate source data gateway 150.

Figure 3:
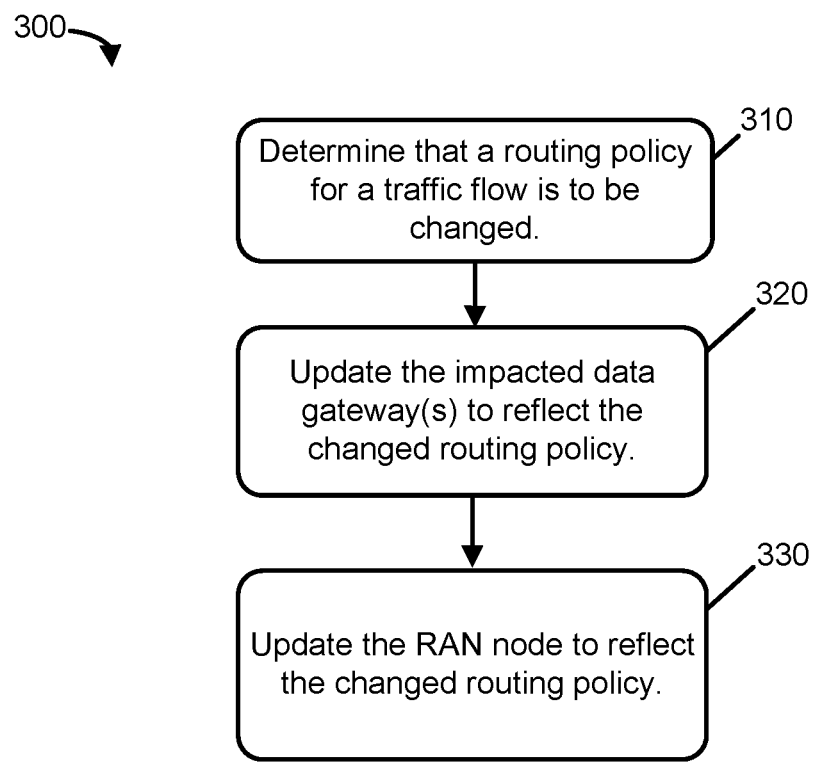
FIG. 3 is a flowchart illustrating a process for updating routing policies for traffic flows.

FIG. 3 is a flowchart illustrating a process 300 for updating routing policies for traffic flows. Process 300 may be performed by, for example, network controller 130. In response to the occurrence of certain events, such as changes in network load, the failure of network devices, the addition of network devices, or other events, it may be beneficial to dynamically change the routing policies associated with the traffic flows. The routing policies may be changed on a per-flow basis.

Process 300 may include determining that a routing policy for a traffic flow is to be changed (block 310). In one implementation, network controller 130 may monitor the load and/or congestion at various network devices (e.g., at data gateways 150) in wireless network 110. In some implementations, network controller 130 may also monitor the operational state (i.e., whether a particular network device is working normally or has failed) of various network devices in wireless network 110. The monitoring procedure may be activated by network controller 130 towards data gateway 150 to report the network conditions, such as by periodically reporting the network conditions or based on the occurrence of events. For event-driven reporting, the data gateway may update the network conditions with network controller 130 based on configured thresholds or instances. Additionally, network controller 130 may query for a real-time network condition by sending a query message to one or more data gateways 150 to receive the latest network conditions. Network controller 130 may determine, based on the monitored load and/or operational state, to change the routing policy for a traffic flow. For example, if one of data gateway 150 becomes heavily congested, it may be desirable to change the routing of one or more traffic flows to another data gateway 150. For example, based on the fullness of buffers in a particular data gateway 150 (e.g., based on a threshold fullness value), network controller 130 may determine to change the routing rules for traffic flow(s).

Process 300 may further include updating the impacted data gateways to reflect the changed routing policy (block 320). Network controller 130 may, for instance, set the routing rules at the data gateways 150 that were changed in block 310.

Process 300 may further include updating the RAN node to reflect the changed routing policy (block 330). Network controller 130 may, for instance, set the routing rules at RAN node 120 to indicate a different source data gateway 150 for a traffic flow.

Figure 4:
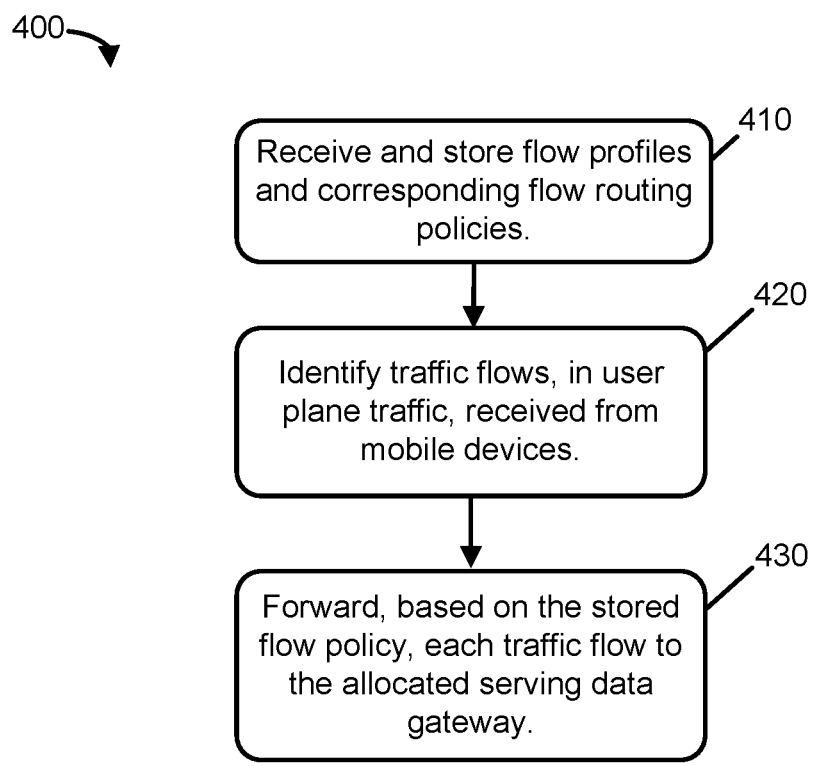
FIG. 4 is a flowchart illustrating a process for forwarding traffic flows at a RAN node.

FIG. 4 is a flowchart illustrating a process 400 for forwarding traffic flows at a RAN node. Process 400 may include receiving and storing flow profiles and corresponding flow routing policies (block 410). As previously mentioned, the flow profiles and flow routing policies may be received from network controller 130.

Process 400 may further include identifying traffic flows, in the user plane traffic, received from mobile devices (block 420). RAN node 120 may identify that a packet (e.g., an IP packet) as corresponding to a particular traffic flow identifier based on headers in the packet, such as, for example, based on the source and destination IP address, port numbers, and traffic type information. Alternatively or additionally, in some implementations, mobile device may include flow identifiers in the packets transmitted by the mobile device. In this situation, RAN node 120 may directly identify the flow, for a particular packet, based on the flow identifier. Based on the identified traffic flows, RAN node 120 may forward the packets of each traffic flow to the allocated serving data gateway (block 430) according to the routing policies. That is, RAN node 120 may directly forward two different traffic flows to more than one service data gateway.

Figure 5:
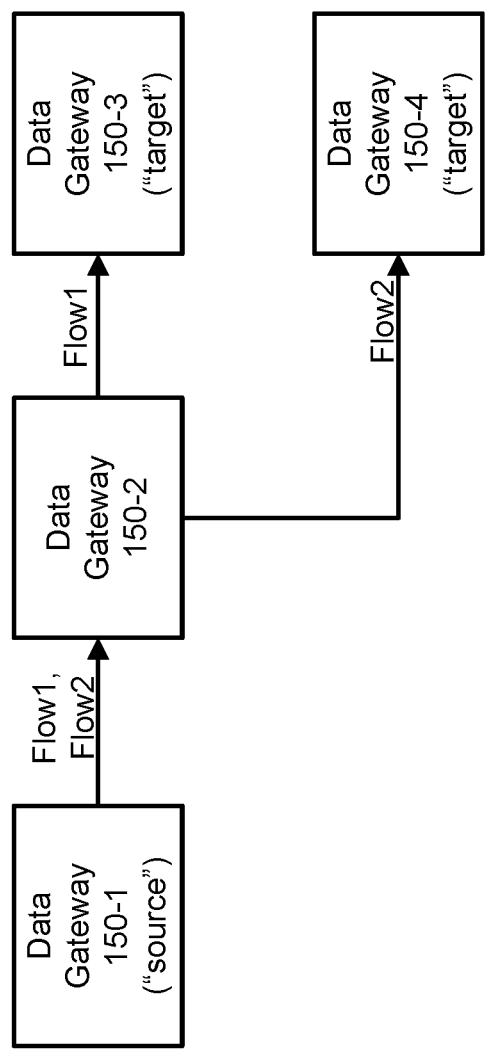
FIG. 5 is a diagram conceptually illustrating the enforcement of flow based routing policies between data gateways.

FIG. 5 is a diagram conceptually illustrating the enforcement of flow based routing policies between data gateways. Four data gateways 150-1, 150-2, 150-3, and 150-4 are shown in FIG. 5. In this example, assume that RAN node 120 was configured, by network controller 130, to forward the packets of two traffic flows, labeled as "flow1" and "flow2," to data gateway 150-1 (the "source" data gateway). Additionally, in this example, data gateway 150-3 is the target data gateway for flow1 and data gateway 150-4 is the target data gateway for flow2. That is, data gateway 150-3 represents the network device that provides the interface, between wireless network 110 and external network 160, for packets of flow1, and data gateway 150-4 represents the network device that provides an interface, between wireless network 110 and external network 160, for packets of flow2. In other words, data gateways 150-3 and 150-4 may be at the boundary between wireless network 110 and an external application server or network.

As previously mentioned, network controller 130 may provision the routing policies, including traffic parameters relating to the required QoS of the traffic flows, at data gateways 150. The routing policies may generally control the routing path (e.g., the next hop in the path) of a packet, and the QoS handling of the packet at a particular data gateway 150.

As shown in FIG. 5, packets associated with flow1, when received at data gateway 150-1 (from RAN node 120), may be forwarded to data gateway 150-2, which may further forward the packets to data gateway 150-3. Similarly, packets associated with flow2, when received at data gateway 150-1 (from RAN node 120), may be forwarded to data gateway 150-2, which may further forward the packets to data gateway 150-4. In this manner, by updating the routing policies at data gateways 150, network controller 130 can control the target data gateway 150 for a particular traffic flow. Advantageously, network controller 130 may efficiently reconfigure the routing of traffic flows in wireless network 110. Network controller 130 may thus be able to quickly and efficiently to respond to changes in wireless network 110. For example, in response to congestion at various data gateways 150 in wireless network 110, or in external network 160, network controller 130 may reconfigure the routing policies of the traffic flows to rebalance the network. Similarly, in response to failed network devices, such as a failure of a data gateway, network controller 130 can reconfigure the routing policies to route traffic around a failed data gateway 150.

Figure 6:
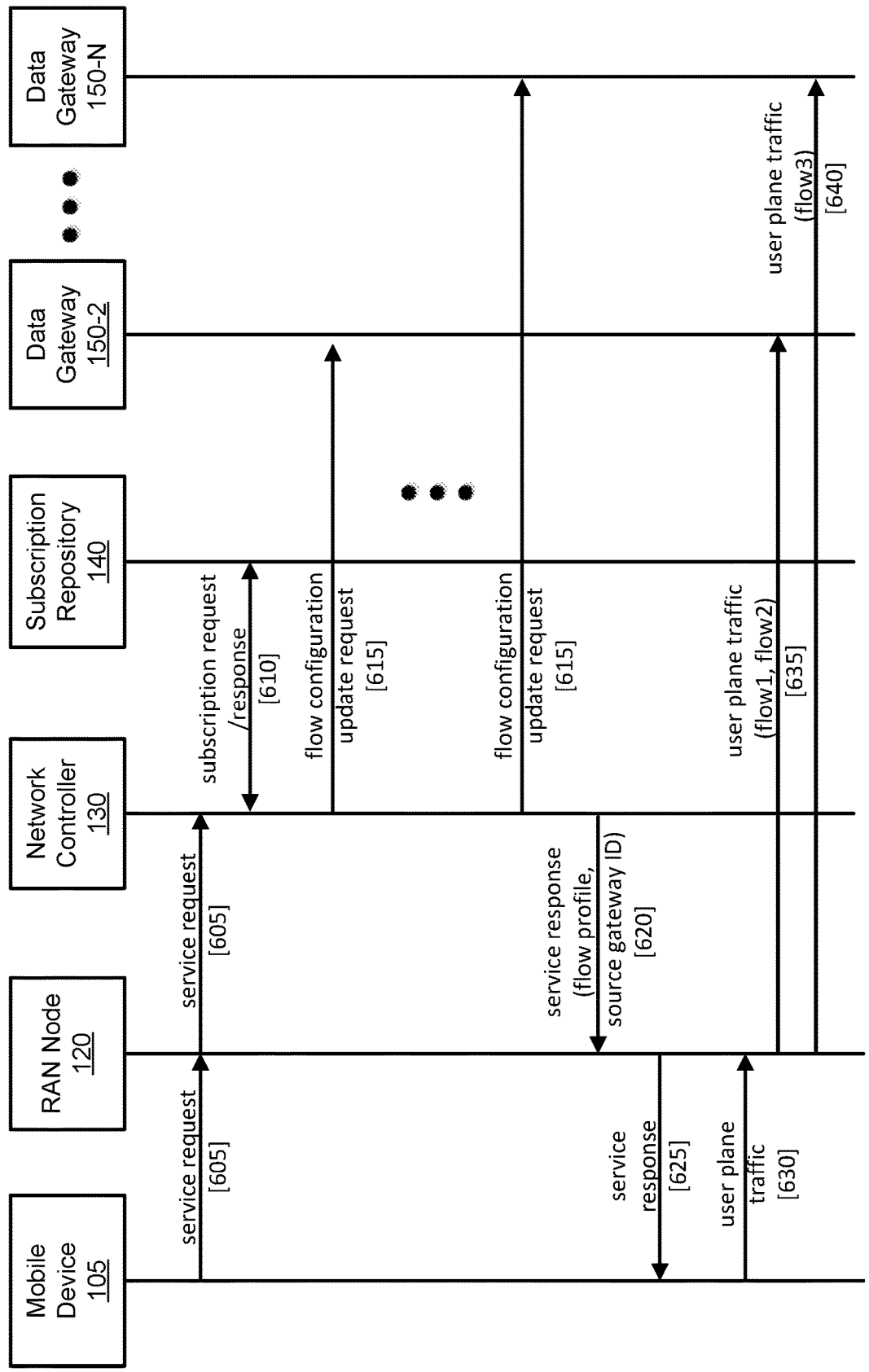
FIG. 6 is a signal flow diagram illustrating an example message exchange between the various devices in wireless network.

FIG. 6 is a signal flow diagram illustrating an example message exchange between the various devices in wireless network 110. As shown, mobile device 105 may initially transmit a service request, via RAN node 120, to network controller 130 (at 605). The service request may include a request to initiate connections with external network 160. For some services, multiple data flows, potentially each of a different type (e.g., video, text, voice) may need to be established. The service request may identify a particular service being requested by mobile device 105, such as by using a service identifier, an application server address, an Access Point Name (APN), or an Uniform Resource Identifier (URI) of an application server.

Network controller 130 may query subscription repository 140 to obtain subscription information, relating to the mobile device 105 and/or the user account of the requested service associated with mobile device 105, that may be needed to determine whether the request should be authorized (at 610, "subscription request/response") in terms of the mobile device 105 and/or the requested service. The subscription information may include device registration information and/or the QoS traffic parameters associated with the traffic flows corresponding to the service request. Based on the response, network controller 130 may determine the one or more flow profiles and routing policies for each of the traffic flows. If the device and the service are both authorized, Network controller 130 may correspondingly update the impacted data gateways 150 to set a routing policy for the traffic flows (at 615, "flow configuration update request"). In one implementation, the communications for acts 605 may be implemented using Layer 3 messages.

Network controller 130 may respond to the service request (at 620, "service response (flow profile, source data gateway ID)"). The response may include flow profiles information for the traffic flows and an identification (e.g., an IP address) of the data gateway(s) 150, for which user plane traffic for each of the traffic flows is to be forwarded. The identified data gateway may correspond to the "source" data gateway in FIG. 5. RAN node 120 may forward the response to mobile device 105 (at 625, "service response"). The response may indicate, to mobile device 105, whether the service request was accepted (or rejected with rejection cause indicated in the response message 620 and/or 625) by wireless network 110.

Assuming that the service request is accepted by wireless network 110, mobile device 105 may subsequently generate user plane traffic (at 630, "user plane traffic"). RAN node 120 may forward the traffic flows to the appropriate data gateways 150, as was indicated in the service response. As shown, for example, user plane traffic corresponding to the traffic flows labeled "flow1" and "flow2" may be forwarded to data gateway 150-1 and user plane traffic corresponding to the traffic flow labeled "flow3" may be forwarded to data gateway 150-N (at 635 and 640).

As described above with respect to the description of FIGS. 2-6, an SDN-based architecture performs QoS provisioning on a per-flow basis for services requested by mobile devices 105. The described network architecture separates the control plane and the user plane for the transport of the user plane traffic. The network entities (e.g., RAN node 120, network controller 130, subscription repository 140, and data gateway 150) are able to adapt, potentially in real-time or near real-time, to changing network configuration according to the network conditions, such as changes in load, changes in the availability of various network entities, or other network condition changes.

In contrast to the techniques described above, certain conventional cellular network architectures may use General Packet Radio Service (GPRS) Tunneling Protocol (GTP)-based QoS mechanisms in which fixed routing paths are used for bearers even when different bearers have different QoS requirements. For example, in a conventional architecture, QoS provisioning may be performed by prioritizing all traffic bearers for a packet data network (PDN) connection, in which the same routing path (established via a GTP tunnel) may be used between the SGW (serving gateway) and the PGW (packet data network gateway). In more detail, packets belonging to different EPS bearers may be marked with certain traffic types based on their QoS requirements. These markings, however, may only dictate the queuing or scheduling of the packets within a router. All the traffic, irrespective of the traffic type, may follow the same path between the SGW and the PGW. Thus, a congested routing path or a routing failure (e.g., a hardware failure) may significantly impact the QoS performance.

In the above description, network controller 130 was described as performing authorization (potentially based on communications with subscription repository 140) for services requested by mobile device 105. Alternatively or additionally, in some implementations, other network devices in the SDN-based architecture may be responsible for performing service authorization.

Figure 7:
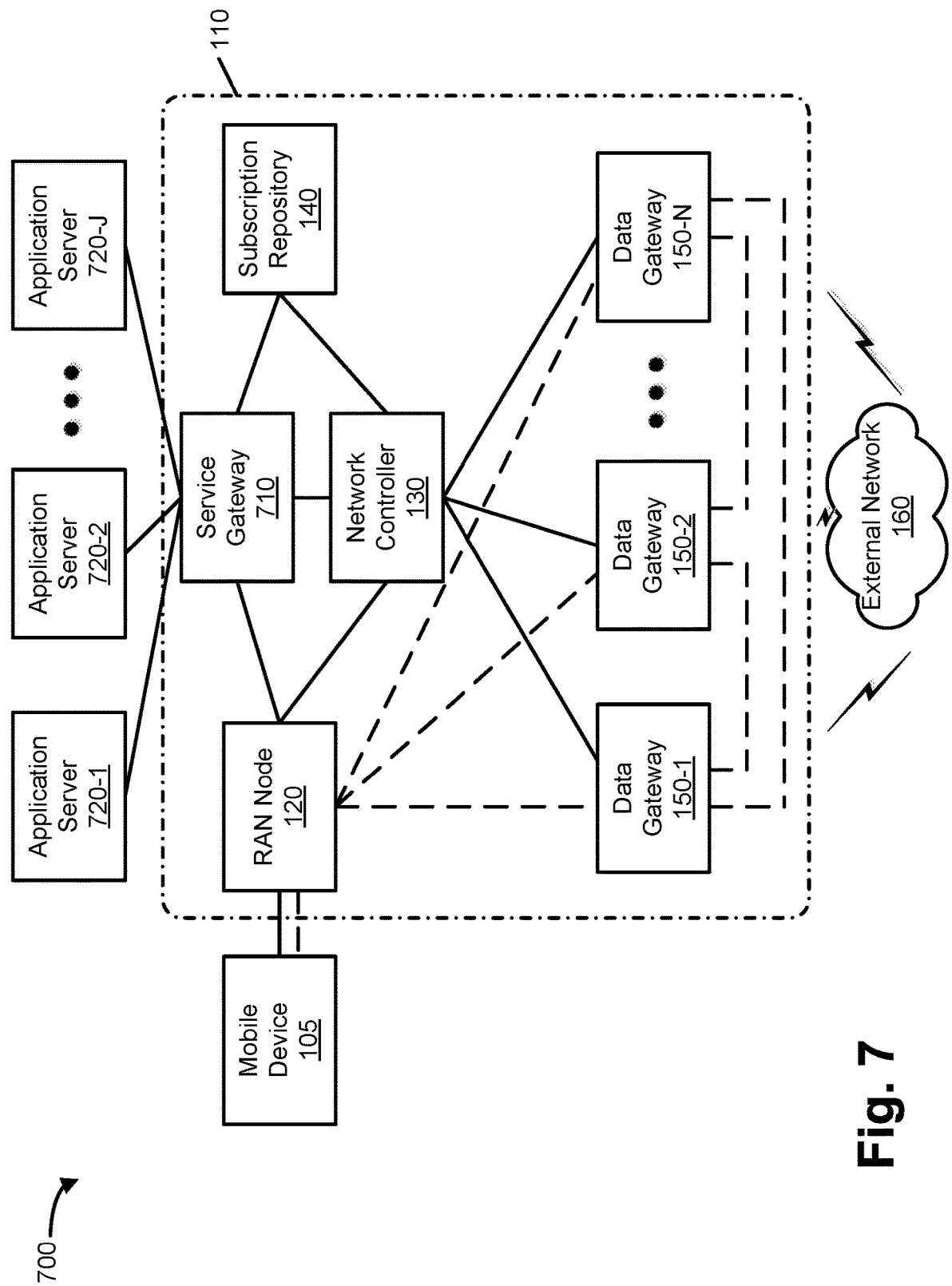
FIG. 7 is a diagram of an example environment illustrating another embodiment of a Software Defined Network (SDN) cellular communications architecture.

FIG. 7 is a diagram of an example environment 700 illustrating another embodiment of an SDN cellular communications architecture. Environment 700 may generally be similar to environment 100, but include the addition of a service gateway 710, which may be responsible for performing service authorizations. Additionally, a number of application servers 720-1 through 720-J are also shown in environment 700.

Service gateway 710 may include one or more computation and communication devices that act as an authorization node for services available to mobile device 105. Service gateway 710 may, for example, communicate with application servers 720 to determine whether a particular service request is authorized. In some implementations, service gateway 710 may obtain information from subscription repository 140 and/or network controller 130 before communicating with an appropriate application server 720.

Application servers 720 may each represent servers and/or external networks that provide particular services to mobile device 105. Although illustrated in FIG. 7 as external to wireless network 110, application servers 720, in some implementations, may be internal to wireless network 110. A control plane interface may connect application servers 720 with service gateway 710. Service gateway 710 may exchange messages with application servers 720 to determine whether the application server authorizes a particular service request. For example, in response to a service request message from mobile device 105, service gateway 710 may determine the application server 720 that is responsible for the particular service, and communicate with the application server to determine whether the service is authorized for the particular mobile device.

In the embodiments of FIG. 7, mobile device 105 may obtain flow profiles, for requested services, potentially using a number of different techniques.

In one embodiment implemented with respect to environment 700, mobile device 105 may obtain flow profiles for a service by transmitting a Layer 3 message towards network controller 130 (e.g., via RAN node 120). Network controller 130 may subsequently perform the service authorization. For example, the service authorization may be performed locally by the network controller 130 or by contacting service gateway 710. Network controller 130 may respond, via a Layer 3 message, to mobile device 105, with the flow profile(s).

In a second embodiment implemented with respect to environment 700, mobile device 105 may obtain flow profiles for a service based on the initiation of two separate signaling procedures. After performing normal attachment procedure with the network controller 130 and obtaining network connectivity, mobile device 105 may initially initiate a first signaling procedure via a direct (control plane) interface to service gateway 710. The first signaling procedure may be used to obtain authorization for the service (e.g., from one of application servers 720). Mobile device 105 may also initiate a second signaling procedure, such as using Layer 3 messages, towards network controller 130 (e.g., via RAN node 120) to obtain authorization to use radio and/or network resources for the service. Network controller 130 may respond, via a Layer 3 message, to mobile device 105, with the flow profile(s).

In a third embodiment implemented with respect to environment 700, mobile device 105 may obtain flow profiles for a service directly from service gateway 710. After performing normal attachment procedure with the network controller 130 and obtaining network connectivity, mobile device 105 may initiate a signaling procedure via a direct interface to service gateway 710. The signaling procedure may be used to obtain authorization for the service (e.g., from one of application servers 720). Service gateway 710 may additionally query network controller 130 to obtain the flow profile from network controller 130. Service gateway 710 may respond, via the direct interface with mobile device 105, with the flow profile(s).

As used herein, the term "circuitry" or "processing circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 8:
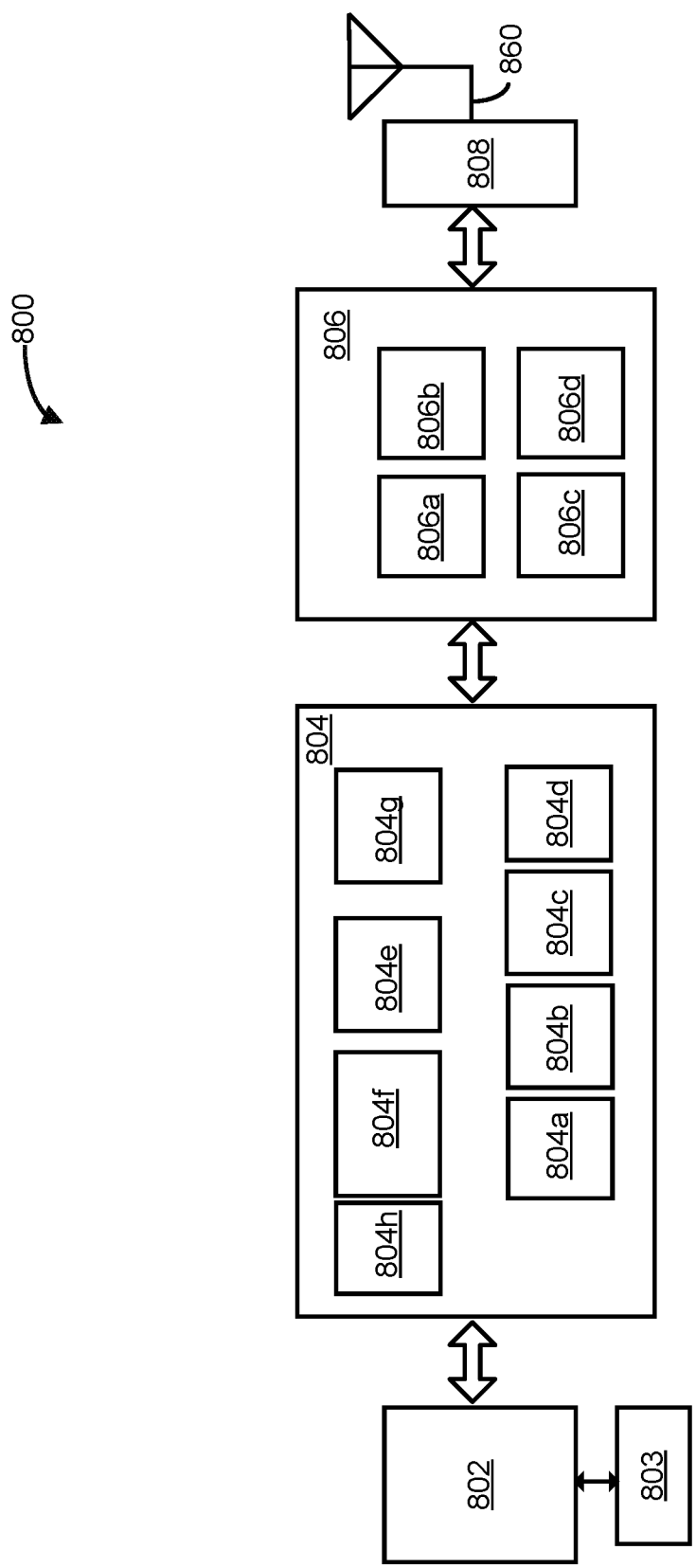
FIG. 8 illustrates example components of an electronic device.

Embodiments described herein may be implemented into a system using any suitably configured hardware and/or software. FIG. 8 illustrates, for one embodiment, example components of an electronic device 800. In embodiments, the electronic device 800 may be a mobile device, a RAN node, a network controller, a subscription repository, a data gateway, a service gateway, or an application server. In some embodiments, the electronic device 800 may include application circuitry 802, baseband circuitry 804, Radio Frequency (RF) circuitry 806, front-end module (FEM) circuitry 808 and one or more antennas 860, coupled together at least as shown. In embodiments in which a radio interface is not needed for electronic device 800 (e.g., a data gateway, network controller, etc.), the RF circuitry 806, FEM circuitry 808, and antennas 860 may be omitted. In other embodiments, any of said circuitries can be included in different devices.

Application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system. The memory/storage may include, for example, computer-readable medium 803, which may be a non-transitory computer-readable medium. Application circuitry 802 may, in some embodiments, connect to or include one or more sensors, such as environmental sensors, cameras, etc.

Baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804a, third generation (3G) baseband processor 804b, fourth generation (4G) baseband processor 804c, and/or other baseband processor(s) 804d for other existing generations, generations in development or to be developed in the future (e.g., fifth generation (5G), 8G, etc.). The baseband circuitry 804 (e.g., one or more of baseband processors 804a-d) may handle various radio control functions that enable communication with one or more radio networks via the RF circuitry 806. The radio control functions may include, but are not limited to, signal modulation/demodulation, encoding/decoding, radio frequency shifting, etc. In some implementations, the functionality of baseband circuitry 904 may be wholly or partially implemented by memory/storage devices configured to execute instructions stored in the memory/storage. The memory/storage may include, for example, a non-transitory computer-readable medium 804h.

In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments. In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f. The audio DSP(s) 804f may be include elements for compression/decompression and echo cancellation and may include other suitable processing elements in other embodiments.

In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f The audio DSP(s) 104f may be include elements for compression/decompression and echo cancellation and may include other suitable processing elements in other embodiments.

Baseband circuitry 804 may further include memory/storage 804g. The memory/storage 804g may be used to load and store data and/or instructions for operations performed by the processors of the baseband circuitry 804. Memory/storage 804g may particularly include a non-transitory memory. Memory/storage for one embodiment may include any combination of suitable volatile memory and/or non-volatile memory. The memory/storage 804g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 804g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b and filter circuitry 806c. The transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals.

Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In various embodiments, when the electronic device 800 is implemented as part of a user equipment (UE), the baseband circuitry 804 may be configured to determine based on communication with an evolved node B (eNB), a higher layer configuration of physical downlink control channel (PDSCH) resources with shortened time transmission interval (TTI), where in the PDSCH resources are subset of the ZP CSI-RS resources; and determine an indication of a PDSCH transmission with shortened TTI using the configured resources using the DCI. In such embodiments, RF circuitry 806 may provide for the communication with the eNB.

In other embodiments, when the electronic device 800 is implemented as part of a user equipment (UE), the radio frequency (RF) circuitry may be configured to receive an indication of a modulation and coding scheme (MCS) and a resource allocation from an eNB; and baseband circuitry 804 may be configured to calculate a number of available resources ($N_{RE}$) within the resource allocation; and determine a TBS indication based on the MCS and the $N_{RE}$ within the resource allocation.

In other embodiments, when the electronic device 800 is implemented as part of a user equipment (UE), the baseband circuitry 804 may be configured to determine, based on a communication from an eNB, a configuration of ZP CSI-RS resources for a physical downlink shared channel (PDSCH) resource element (RE) mapping and quasi co-location (QCL) set without sub-frame and periodic ZP CSI-RS resource configuration; and determine an indication of the ZP CSI-RS presence using downlink control information (DCI) scheduling on one or more corresponding sub-frames on the PDSCH. In such embodiments, RF circuitry 806 may provide for the communication with the eNB.

In various embodiments, when the electronic device 800 is implemented as part of an eNB the baseband circuitry 804 may be configured to schedule ZP CSI-RS resources for a physical downlink shared channel (PDSCH) resource element (RE) mapping and quasi co-location (QCL) set without sub-frame and periodic ZP CSI-RS resource configuration; and generate a downlink control information (DCI) indication to indicate the ZP CSI-RS on one or more corresponding sub-frames on the PDSCH; and the RF circuitry 806 may provide the DCI message to a user equipment (UE).

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c. The filter circuitry 806c may include a low-pass filter (LPF), although the scope of the embodiments is not limited in this respect.

In some embodiments, the mixer circuitry 806a of the receive signal path and the mixer circuitry 806a of the transmit signal path may include two or more mixers and may be arranged for quadrature downconversion and/or upconversion respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and/or direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+6 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+6 synthesizer.

In some embodiments, frequency input may be provided by a voltage-controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+6 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 860, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 860.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 860.

In some embodiments, the electronic device 800 may include additional elements such as, for example, memory/storage, display, camera, sensors, and/or input/output (I/O) interface. In some embodiments, the electronic device of FIG. 8 may be configured to perform one or more methods, processes, and/or techniques such as those described herein.

Figure 9:
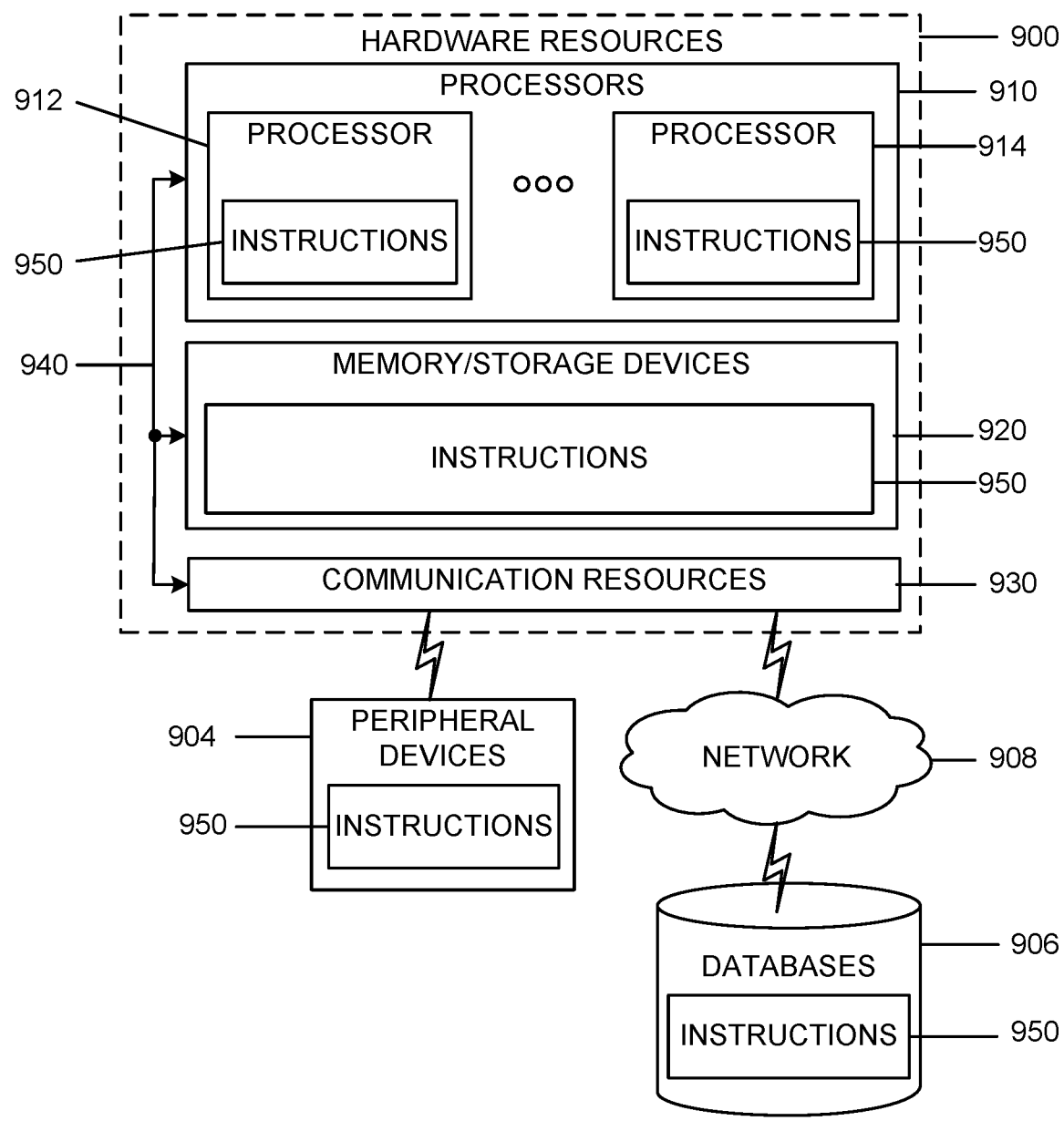
FIG. 9 is a block diagram example components of another electronic device.

FIG. 9 is a block diagram illustrating components, according to some example embodiments, able to read instructions from a machine-readable or computer-readable medium (e.g., a machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which are communicatively coupled via a bus 940.

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 912 and a processor 914. The memory/storage devices 920 may include main memory, disk storage, or any suitable combination thereof.

The communication resources 930 may include interconnection and/or network interface components or other suitable devices to communicate with one or more peripheral devices 904 and/or one or more databases 906 via a network 908. For example, the communication resources 930 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 and/or the databases 906. Accordingly, the memory of processors 910, the memory/storage devices 920, the peripheral devices 904, and the databases 906 are examples of computer-readable and machine-readable media.

A number of examples, relating to implementations of the techniques described above, will next be given.

In a first example, a network controller, for a cellular communication network, may include circuitry to process a service request from a mobile device, the service request corresponding to a plurality of traffic flows; determine a flow profile for each of the plurality of traffic flows, each of the flow profiles including a flow identifier and Quality of Service (QoS) parameters relating to the corresponding traffic flow; determine, for at least some of the plurality of traffic flows and on a per-traffic flow basis, routing policies relating to routing of the plurality of traffic flows in the cellular communication network; and provide the routing policies to a plurality of data gateways.

In example 2, the subject matter of example 1, or any of the examples herein, wherein the network controller additionally includes circuitry to query, based on the service request received from the mobile device, a subscription repository to obtain service authorization for the service request and information relating to the QoS parameters.

In example 3, the subject matter of example 1, or any of the examples herein, wherein the network controller additionally includes circuitry to check, based on the service request received from the mobile device, a stored subscription repository, at the network controller, to determine service authorization for the service request and information relating to the QoS parameters.

In example 4, the subject matter of example 1, or any of the examples herein, wherein the flow profile additionally includes at least one of an indication of a traffic type of the flow, an allowable packet error rate of the flow, a maximum latency of the flow, or a priority index of the flow.

In example 5, the subject matter of example 4, or any of the examples herein, wherein the network controller additionally includes circuitry to: provide, to a Radio Access Network (RAN) node, information relating to the flow profiles to identify the traffic flows and information relating to the routing policies to cause the RAN node to forward the traffic flows, received from the mobile device, towards corresponding ones of the plurality of data gateways.

In example 6, the subject matter of example 1, or any of the examples herein, wherein the network controller additionally includes circuitry to receive information relating to congestion or failure of one or more of the plurality of data gateways; and reconfigure, based on the received information relating to congestion or failure, the routing policies corresponding to at least one of the data gateways.

In example 7, the subject matter of example 1, or any of the examples herein, wherein the plurality of data gateways include at least a first gateway and a second gateway, and wherein the routing policies cause at least one of the traffic flows to be routed to the first data gateway and another of the traffic flows to be routed to the second data gateway.

In example 8, the subject matter of example 7, or any of the examples herein, wherein the network controller additionally includes circuitry to cause configuration of the routing policies at the first data gateway and the second data gateway, such that at least one of the plurality of traffic flows are forwarded from a Radio Access Node (RAN) node to the first data gateway, and from the first data gateway to the second data gateway.

In a ninth example, a computer readable medium containing program instructions for causing one or more processors, associated with a network device for a cellular communication network, to: receive a service request from a mobile device; determine, based on the service request, a plurality of traffic flows corresponding to the service request; determine a flow profile for each of the plurality of traffic flows, each of the flow profiles including a flow identifier and Quality of Service (QoS) parameters relating to the corresponding traffic flow; determine, for at least some of the plurality of traffic flows and on a per-traffic flow basis, routing policies relating to routing of the plurality of traffic flows in the cellular communication network; and provide the routing policies to a plurality of data gateways.

In example 10, the subject matter of example 9, or any of the examples herein, wherein the program instructions further cause the one or more processors to query, based on the service request received from the mobile device, a subscription repository to obtain service authorization for the service requested by the mobile device and information relating to the QoS parameters.

In example 11, the subject matter of example 9, or any of the examples herein, wherein the program instructions further cause the one or more processors to check, based on the service request received from the mobile device, a stored subscription repository, at the network controller, to determine service authorization for the service request and information relating to the QoS parameters.

In example 12, the subject matter of example 9, or any of the examples herein, wherein the cellular communication network is implemented as a Software Defined Network (SDN).

In example 13, the subject matter of example 1 or 9, or any of the examples herein, wherein different ones of the plurality of traffic flows, corresponding to the service request, relate to different traffic types.

In example 14, the subject matter of example 1 or 6, or any of the examples herein, wherein the routing policies are configured via a control plane signaling interface.

In a $15^{th}$ example, a Radio Access Network (RAN) node for a cellular communication network may comprise: a radio interface to connect to mobile devices; a plurality of user plane interfaces to connect to a corresponding plurality of data gateways of the cellular communication network; a control plane interface to connect to a network controller of the cellular communication network; and processing circuitry to: cause forwarding of a service request, for data services, from a mobile device to a network controller, via the control plane interface; process, in response to the service request: flow profiles corresponding to a plurality of traffic flows that are used to fulfill the service request, each of the flow profiles including a flow identifier, and routing policies that include routing rules relating to the plurality of traffic flows, the routing rules including, for each of the plurality of traffic flows, an indication of a corresponding source data gateway, of the plurality of data gateways; and cause forwarding, of received packets corresponding to the plurality of traffic flows, towards the source gateway indicated by the routing rules for each of the plurality of the traffic flows.

In example 16, the subject matter of example 15, or any of the examples herein, wherein the plurality of traffic flows, for the service request, correspond to traffic flows of different traffic types.

In example 17, the subject matter of example 15, or any of the examples herein, wherein the flow profiles additionally include an indication of a traffic type of the traffic flow, an allowable packet error rate of the traffic flow, a maximum latency of the traffic flow, or a priority index of the traffic flow.

In example 18, the subject matter of example 15, or any of the examples herein, wherein the service request identifies the requested service using a service identifier, an application server address, an Access Point Name (APN), or an Uniform Resource Identifier (URI) of an application server.

In example 19, the subject matter of example 15, or any of the examples herein, wherein each of the routing policies additionally include an indication of a corresponding target data gateway, in the cellular communication network, the target data gateway corresponding to the interface between the cellular communication network and an external network or service.

In a 20$^{th}$ example, a Radio Access Network (RAN) node may comprise: means for receiving, in response to a service request received from a mobile device: routing policies that include routing rules relating to a plurality of traffic flows that are used to fulfill the service request, the routing rules including, for each of the plurality of traffic flows, an indication of a corresponding target data gateway, of a plurality of data gateways, in a cellular communication network, to which traffic of the corresponding traffic flow is to be forwarded, wherein the target data gateways, of the plurality of data gateways, are determined on a per-traffic flow basis; means for identifying a particular one of the plurality of the traffic flows; and means for forwarding, based on the routing rules corresponding to the identified particular one of the plurality of the traffic flows, packets corresponding to the particular one of the plurality of the traffic flows to the corresponding target data gateway.

In example 21, the subject matter of example 20, or any of the examples herein, wherein the plurality of traffic flows, for the service request, correspond to traffic flows of different traffic types.

In example 22, the subject matter of example 20, or any of the examples herein, further comprising: means for receiving flow profiles corresponding to the plurality of traffic flows, wherein the flow profiles additionally include at least one of an indication of a traffic type of the traffic flow, an allowable packet error rate of the traffic flow, a maximum latency of the traffic flow, or a priority index of the traffic flow.

In example 23, the subject matter of example 20, or any of the examples herein, wherein the service request identifies the requested service using at least one of a service identifier, an application server address, an Access Point Name (APN), or an Uniform Resource Identifier (URI) of an application server.

In example 24, the subject matter of example 20, or any of the examples herein, wherein each of the routing policies additionally include an indication of a corresponding second target data gateway, in the cellular communication network, wherein the second target data gateway is connected to an external network of the cellular communication network.

In example 25, the subject matter of example 20, or any of the examples herein, wherein the cellular communication network is implemented as a Software Defined Network (SDN).

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 2-4 and 6, the order of the signals may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. A network controller, for a cellular communication network, the network controller comprising a computer-readable medium that includes processing instructions to:
   in response to a service request from a mobile device, the service request corresponding to a plurality of traffic flows:
      determine a flow profile for each of the plurality of traffic flows, each of the flow profiles including a flow identifier and Quality of Service (QoS) parameters relating to the corresponding traffic flow;
      determine, for at least some of the plurality of traffic flows and on a per-traffic flow basis, routing information relating to routing of the plurality of traffic flows in the cellular communication network; and
      provide the routing information to a plurality of data gateways.

2. The network controller of claim 1, wherein the computer-readable medium further includes processing instructions to:
   query, based at least on the service request received from the mobile device, a subscription repository to obtain service authorization for the service request and information relating to the QoS parameters.

3. The network controller of claim 1, wherein the computer-readable medium further includes processing instructions to:
   check, based at least on the service request received from the mobile device, a stored subscription repository, at the network controller, to determine service authorization for the service request and information relating to the QoS parameters.

4. The network controller of claim 1, wherein the flow profile additionally includes at least one of an indication of a traffic type of the flow, an allowable packet error rate of the flow, a maximum latency of the flow, or a priority index of the flow.

5. The network controller of claim 4, wherein the computer-readable medium includes processing instructions to:
provide, to a Radio Access Network (RAN) node, information relating to the flow profiles to identify the traffic flows and information relating to the routing information to cause the RAN node to forward the traffic flows, received from the mobile device, towards corresponding ones of the plurality of data gateways.

6. The network controller of claim 1, wherein the computer-readable medium includes processing instructions to:
receive information relating to congestion or failure of one or more of the plurality of data gateways; and
reconfigure, based at least on the received information relating to congestion or failure, the routing information corresponding to at least one of the data gateways.

7. The network controller of claim 1, wherein the plurality of data gateways include at least a first data gateway and a second data gateway, and wherein the routing information causes at least one of the traffic flows to be routed to the first data gateway and another of the traffic flows to be routed to the second data gateway.

8. The network controller of claim 7, wherein the computer-readable medium includes processing instructions to:
cause configuration of the routing information at the first data gateway and the second data gateway, such that at least one of the plurality of traffic flows are forwarded from a Radio Access Node (RAN) node to the first data gateway, and from the first data gateway to the second data gateway.

9. The network controller of claim 1, wherein the cellular communication network is implemented as a Software Defined Network (SDN).

10. The network controller of claim 1, wherein the service request is a request to establish connections.

11. A non-transitory computer-readable medium containing program instructions for causing one or more processors, associated with a network device for a cellular communication network, to:
in response to a service request from a mobile device:
determine, based at least on the service request, a plurality of traffic flows corresponding to the service request;
determine a flow profile for each of the plurality of traffic flows, each of the flow profiles including a flow identifier and Quality of Service (QoS) parameters relating to the corresponding traffic flow;
determine, for at least some of the plurality of traffic flows and on a per-traffic flow basis, routing information relating to routing of the plurality of traffic flows in the cellular communication network; and
provide the routing information to a plurality of data gateways.

12. The non-transitory computer-readable medium of claim 11, wherein the program instructions further cause the one or more processors to:
query, based at least on the service request received from the mobile device, a subscription repository to obtain service authorization for the service requested by the mobile device and information relating to the QoS parameters.

13. The non-transitory computer-readable medium of claim 11, wherein the program instructions further cause the one or more processors to:
check, based at least on the service request received from the mobile device, a stored subscription repository, at the network controller, to determine service authorization for the service request and information relating to the QoS parameters.

14. The non-transitory computer readable medium of claim 11, wherein the cellular communication network is implemented as a Software Defined Network (SDN).

15. The non-transitory computer readable medium of claim 11, wherein different ones of the plurality of traffic flows, corresponding to the service request, relate to different traffic types.

16. The non-transitory computer readable medium of claim 11, wherein the routing information are configured via a control plane signaling interface.

17. Radio Access Network (RAN) node for a cellular communication network, the RAN node comprising:
a plurality of user plane interfaces to connect to a corresponding plurality of data gateways of the cellular communication network;
a control plane interface to connect to a network controller of the cellular communication network; and
processing circuitry to:
cause forwarding of a service request, for data services, from a mobile device to a network controller, via the control plane interface;
process, in response to the service request:
flow profiles corresponding to a plurality of traffic flows that are used to fulfill the service request, each of the flow profiles including a flow identifier, and
routing information that includes routing rules relating to the plurality of traffic flows, the routing rules including, for each of the plurality of traffic flows, an indication of a corresponding source data gateway, of the plurality of data gateways; and
cause forwarding, of received packets corresponding to the plurality of traffic flows, towards the source gateway indicated by the routing rules for each of the plurality of the traffic flows.

18. The RAN node of claim 17, wherein the plurality of traffic flows, for the service request, correspond to traffic flows of different traffic types.

19. The RAN node of claim 17, wherein the flow profiles additionally include an indication of a traffic type of the traffic flow, an allowable packet error rate of the traffic flow, a maximum latency of the traffic flow, or a priority index of the traffic flow.

20. The RAN node of claim 17, wherein the service request identifies the requested service using a service identifier, an application server address, an Access Point Name (APN), or a Uniform Resource Identifier (URI) of an application server.

21. The RAN node of claim 17, wherein each of the routing information additionally include an indication of a corresponding target data gateway, in the cellular communication network, the target data gateway corresponding to the interface between the cellular communication network and an external network or service.

* * * * *